(12) United States Patent
Benini (10) Patent No.: US 12,140,502 B2
(45) Date of Patent: Nov. 12, 2024

(54) WHEEL LOAD ASSEMBLY FOR A DYNAMOMETER TEST BENCH AND DYNAMOMETER TEST BENCH

(71) Applicant: BREMBO S.p.A., Bergamo (IT)

(72) Inventor: Claudio Benini, Bergamo (IT)

(73) Assignee: Brembo S.p.A., Bergamo (IT)

( * ) Notice: Subject to any disclaimer, the term of this patent is extended or adjusted under 35 U.S.C. 154(b) by 232 days.

(21) Appl. No.: 17/907,728

(22) PCT Filed: Mar. 16, 2021

(86) PCT No.: PCT/IB2021/052166
§ 371 (c)(1),
(2) Date: Sep. 29, 2022

(87) PCT Pub. No.: WO2021/198823
PCT Pub. Date: Oct. 7, 2021

(65) Prior Publication Data
US 2023/0135131 A1 May 4, 2023

(30) Foreign Application Priority Data
Mar. 30, 2020 (IT) .................. 102020000006577

(51) Int. Cl.
*G01M 17/04* (2006.01)
*G01L 5/28* (2006.01)

(52) U.S. Cl.
CPC .............. *G01M 17/04* (2013.01); *G01L 5/28* (2013.01)

(58) Field of Classification Search
CPC .................................. G01M 17/04; G01L 5/28
(Continued)

(56) References Cited

U.S. PATENT DOCUMENTS 4,263,809 A * 4/1981 Petersen ............. G01M 13/027
73/116.01
4,658,656 A * 4/1987 Haeg ................... G01M 17/007
73/669

(Continued)

FOREIGN PATENT DOCUMENTS

| CN | 109596369 A | 4/2019 |
| DE | 102017200516 A1 | 7/2018 |
| GB | 2240604 A | 8/1991 |

OTHER PUBLICATIONS

European Patent Office, International Search Report and Written Opinion in Application No. PCT/IB2021/052166, dated Jun. 29, 2021, 11 pages, Rijswijk, Netherlands.

*Primary Examiner* — Eric S. McCall
(74) *Attorney, Agent, or Firm* — Marshall & Melhorn, LLC (57) ABSTRACT

A wheel load assembly (5) for a dynamometer test bench (1) comprises—a support structure (17) which can be assembled on a base (12), —a vertical load device (18) having a first application bracket (19) which is rigidly connectable to a bearing body (96), which in turn is couplable to the wheel suspension part (3), a first reaction support (20) connected to the support structure (17), a first force transmission connector (21) connected between the first reaction support (20) and the first application bracket (19), as well as a first load apparatus (22) operatively connected to the first force transmission connector (21) to load the first force transmission connector (21) in a first vertical load direction (23), —a longitudinal load device (24) having a second application bracket (25) which is rigidly connectable to the bearing body (96), which in turn is couplable to the wheel suspension part (3), a second reaction support (26) connected to the support structure (17), a second force transmission connector (27)

(Continued)

connected between the second reaction support (26) and the second application bracket (25), as well as a second load apparatus (28) operatively connected to the second force transmission connector (27) to load the second force transmission connector (27) in a second longitudinal load direction (29) transverse to the first vertical load direction (23) and to a wheel rotation axis (40) of the wheel suspension part (3), —a lateral load device (30) having a third application bracket (31) which is rigidly connectable to the bearing body (96), which in turn is couplable to the wheel suspension part (3), a third reaction support (32) connected to the support structure (17), a third force transmission connector (33) connected between the third reaction support (32) and the third application bracket (31), as well as a third load apparatus (34) to load the third force transmission connector (33) in a third lateral load direction (35) parallel to the wheel rotation axis (40) and transverse to the first vertical load direction (23) and to the second longitudinal load direction (29), in which the vertical, longitudinal, and lateral load devices comprise respective adjustment devices for adjusting the position of the application points of the vertical, longitudinal, and lateral forces.

21 Claims, 9 Drawing Sheets

(58) Field of Classification Search
USPC .......................................................... 73/669
See application file for complete search history.

(56) References Cited

U.S. PATENT DOCUMENTS

| | | | | |
|---|---|---|---|---|
| 4,733,558 A | * | 3/1988 | Grenier | G01M 13/027 73/115.07 |
| 4,981,034 A | * | 1/1991 | Haeg | G01M 17/04 73/115.07 |
| 5,465,615 A | * | 11/1995 | Petersen | G01M 13/027 73/115.07 |
| 5,533,403 A | * | 7/1996 | Haeg | G01M 13/027 73/865.6 |
| 5,610,330 A | * | 3/1997 | Fricke | G01M 17/0074 73/146 |
| 6,257,055 B1 | * | 7/2001 | Haeg | G01M 13/027 73/116.01 |
| 6,640,638 B1 | * | 11/2003 | Haeg | G01M 17/007 73/116.01 |
| 7,146,859 B2 | * | 12/2006 | Dittmann | G01M 17/007 73/669 |
| 7,461,556 B2 | * | 12/2008 | Hamilton | G01M 17/007 73/117.03 |
| 8,966,987 B2 | * | 3/2015 | Clusserath | G01M 17/0074 73/116.01 |
| 11,662,273 B2 | * | 5/2023 | Yin | G01M 17/0078 73/669 |
| 2006/0059993 A1 | * | 3/2006 | Temkin | G01M 17/007 73/669 |

* cited by examiner

WHEEL LOAD ASSEMBLY FOR A DYNAMOMETER TEST BENCH AND DYNAMOMETER TEST BENCH

FIELD

The present invention relates to a wheel load assembly for a dynamometer test bench and a dynamometer test bench for carrying out experimental tests characterizing the mechanical and acoustical behavior—the so-called NVH behavior (noise, vibration, harshness) of a brake, of a brake-wheel hub assembly or of a brake-wheel hub-suspension assembly of a vehicle, hereinafter referred to as a "part of wheel suspension" for simplicity.

BACKGROUND

Brake tests aiming to measure noise, vibrations and to subjectively assess the unpleasantness resulting from such noises or vibrations (NVH) using inertia dynamometer test benches are one of the most common laboratory tests in the automobile industry.

Dynamometer test benches are known, having a support structure (the so-called "fixture frame") configured to support, according to the simulation detail:

- the brake disc and the related caliper or the drum and the related brake shoes, or
- the brake disc and the related caliper or the drum and the related brake shoes, the wheel hub with the bearing thereof and the stub axle of the suspension, and possibly dust shields, or
- the brake disc and the related caliper or the drum and the related brake shoes, the wheel hub with the bearing thereof and the stub axle of the suspension, the spring-damper assembly of the suspension, and possibly dust shields, or
- the brake disc and the related caliper or the drum and the related brake shoes, the wheel hub with the bearing thereof and the stub axle of the suspension, the spring-damper assembly of the suspension, at least part of the steering mechanism, and possibly dust shields, and possibly further components of the "corner" of the vehicle, hereinafter referred to as a "part of wheel suspension" for simplicity.

The hub support structure further comprises a flywheel for simulating the inertia of the vehicle.

In addition to the support structure ("fixture frame"), the known dynamometer test benches comprise a wheel load assembly, the so-called "WLU" (wheel load unit) for forcing or simulating given loads which may act on the part of wheel suspension.

For this purpose, various approaches and systems are known which, according to the hardware detail of the vehicle available (and mounted to the support structure), apply loads resulting from braking forces (longitudinal direction—axis X); loads resulting from a high and/or low speed steering circumstance (lateral direction—axis Y); vertical forces due to the weight of the vehicle and to the dynamic transfer of the weight of the vehicle caused by the braking or curve or by both (vertical direction—axis Z).

The known wheel load assemblies are not generally configured to apply each of the loads which can be assumed in the intensity, position, and desired direction and most appropriate for the dynamometer experimental test to be carried out.

Moreover, the wheel load assemblies of the known art are not sufficiently versatile or configurable to carry out the experimental tests on parts of the wheel suspension with different geometries and with various levels of fidelity with respect to the actual vehicle. For example, it is desirable to carry out the tests with one or more of the following types of load:

- constant load in one or more directions for the entire duration of the test;
- change from a constant load to a further constant load to simulate specific braking events, e.g., parking maneuvers;
- dynamic load during the braking events to simulate a specific maneuver;
- dynamic load to stimulate the road load variations in real time (with a given level of model approximation) resulting from curves, roughness of the road surface, for example with the possibility of selecting the amplitude and the frequency of the specific load.

The known support structures, as well as the known wheel load assemblies have a metal frame structure which is adapted each time to the specific geometrical conditions for the support and load of the part of wheel suspension. This adaptation is at least partly done by hand and requires undesirably long times.

The known wheel load assemblies are also undesirably heavy, and the weight thereof affects and alters the boundary conditions, in particular the modal response of the part of wheel suspension subject to the experimental test and the NVH analysis.

Moreover, although they are suitable for the application of lateral forces, the known wheel load assemblies are not capable of applying longitudinal forces which are synchronized with the dynamic action applied by the brake.

A further disadvantage of the known wheel load assemblies is the lack of adjustment functions thereof for allowing an adaptation thereof to types and dimensions of different parts of wheel suspension.

SUMMARY

Therefore, it is the object of the present invention to provide a wheel load assembly for a dynamometer test bench and a dynamometer test bench having such features as to obviate at least some of the drawbacks described with reference to the known art.

Within the scope of the general object, it is a specific object of the invention to provide a wheel load assembly having such features as to apply, on the part of wheel suspension, dynamic longitudinal loads in combination with the simulation of the inertia of the vehicle by means of the flywheel and, if required, contributed by an electric motor and/or pertaining synchronized or independent lateral loads to simulate lateral forces acting on the vehicle.

It is a further specific object of the invention to provide a wheel load assembly having a more lightweight structure and to facilitate the access to the brake components to allow a quick replacement of the brake components without modifying the entire set test configuration.

It is a further specific object of the invention to provide a wheel load assembly having such features as to apply longitudinal forces in the middle of the wheel hub, preferably in combination with the application of a braking torque in order to simulate the stresses of the vehicle during braking events as realistically as possible.

It is a further specific object of the invention to provide a wheel load assembly having such features as to apply dynamic longitudinal and/or lateral and/or vertical forces to the wheel hub according to force-time curves which can be set and synchronized with the dynamometric action of the brake.

It is a further specific object of the invention to provide a wheel load assembly having such features as to allow the adjustment of the application points of the forces with broad flexibility and the fastening thereof at the start of the test in order to simulate, more realistically, for example, the position of various offsets of the wheel rim (rim offset position or rim ET position) and/or various wheel radii with the intent to replicate the use of different tires.

It is a further specific object again of the invention to provide a wheel load assembly configured to allow a modular reconfiguration thereof and the repositioning, removal, and replacement of individual components in an easy and modular manner.

At least some of the objectives of the invention are achieved by a wheel load assembly according to the claims. The dependent claims relate to advantageous and preferred embodiments.

DESCRIPTION OF THE FIGURES

In order to better understand the invention and appreciate the advantages thereof, a description of exemplary and non-limiting embodiments is provided below, with reference to the drawings, in which.

DETAILED DESCRIPTION

Description of the Dynamometer Test Bench 1

Figure 1:
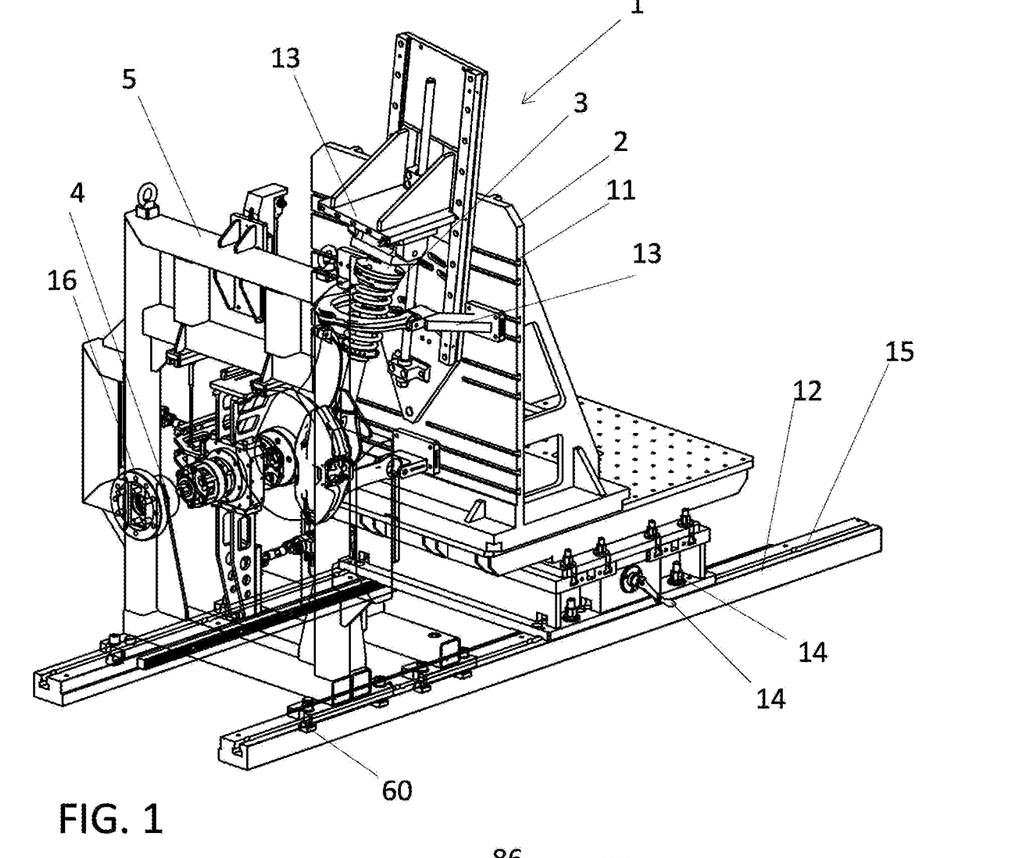
FIG. 1 is a perspective view of a dynamometer test bench according to an embodiment.
Figure 3:
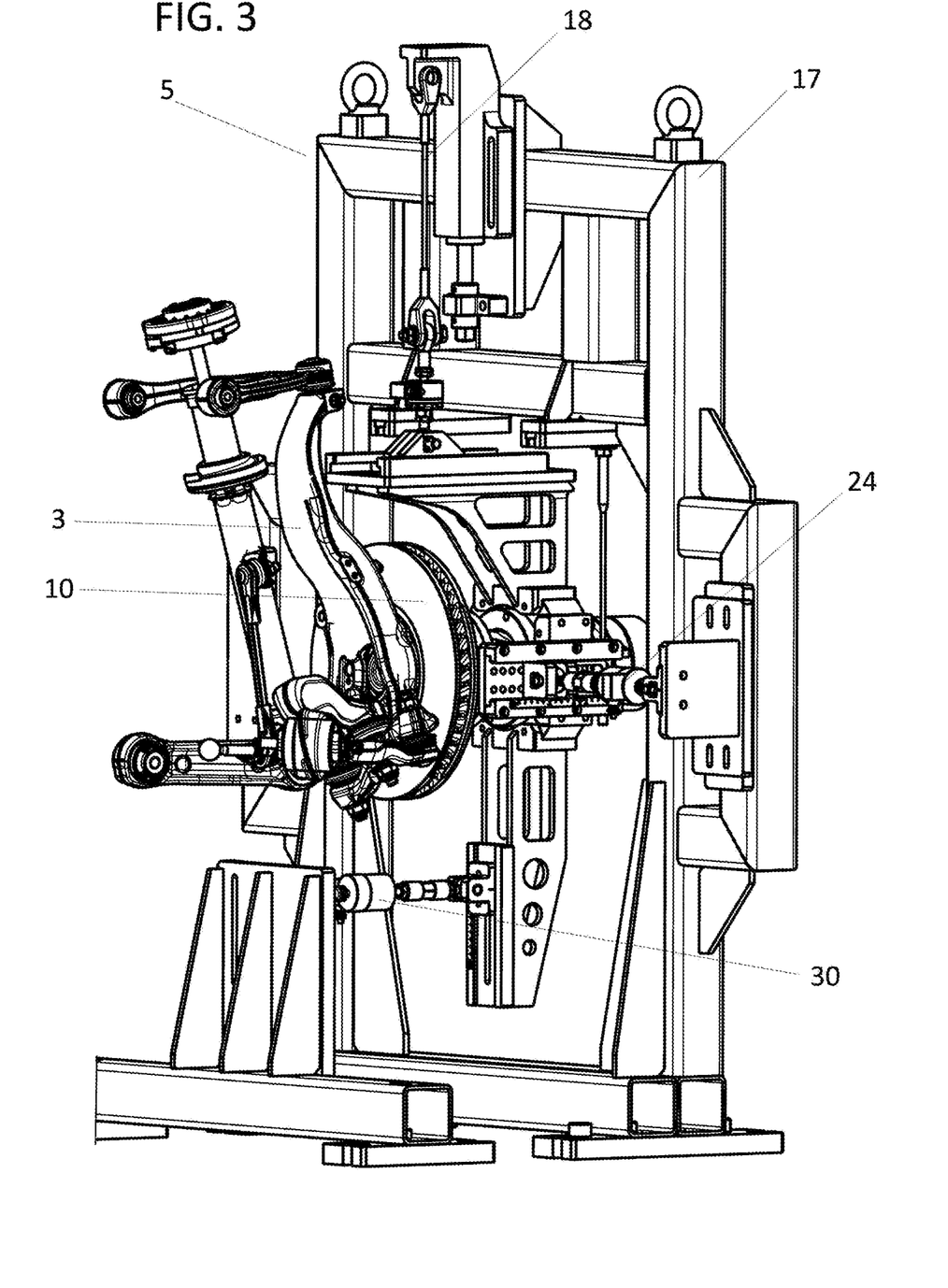
FIG. 3 is a perspective view of a wheel load assembly of the dynamometer test bench according to an embodiment, showing a part of wheel support on which the dynamometer test is to be performed.

A dynamometer test bench 1 comprises:

a support structure 2 for supporting, in a stationary manner, at least a wheel suspension part 3 of a suspension-wheel hub-brake unit ("corner") of a vehicle (not shown), and/or a wheel load assembly 5 (WLU) for applying simulation forces 6, 7, 8 on the wheel suspension part 3, in addition to a possible braking torque 9 which can be generated by operating brake 10, for example by means of a disc brake or a drum brake of the wheel suspension part 3. The operation of brake 10, a flywheel and/or a motor of the dynamometer bench, which are described later.

According to the embodiment, the support structure 2 and the wheel load assembly 5 may be assembled on a single dynamometer test bench 1 or they may belong to two separate test benches which are positioned and used together to carry out the tests of brake 10 or of the wheel suspension part 3 in general.

The dynamometer test bench 1 defines an axial direction 55 which is parallel to the wheel rotation axis 40 of the wheel hub 43 of the wheel suspension part 3 mounted on the test bench 1, a longitudinal direction 56, which is horizontal and perpendicular to the axial direction 55, and which substantially corresponds to a guiding direction of the vehicle, as well as a vertical direction 57 which is perpendicular to the axial direction 55 and to the longitudinal direction 56.

Similarly, also the support structure 2 and the wheel load assembly 5 define the same axial, longitudinal, and vertical geometrical axes or directions.

In the continuation of the description, indications of direction of force, adjustment, orientation, or movement indicated with the terms "longitudinal", "axial", "vertical" refer to the aforesaid longitudinal 56, axial 55, vertical 57 directions or to directions parallel thereto, unless otherwise specified.

Description of the Support Structure 2

According to an embodiment, the support structure 2 may comprise a wall or a base frame 11 mounted on a base 12 of the test bench 1, and one or more portions or connecting brackets 13, which are possibly adjustable in height and/or in horizontal direction, for fastening (for example by means of screws) the wheel suspension part 3.

Advantageously, also the position of the base frame 11 on base 12 is adjustable, for example by means of the releasable and lockable engagement of a plurality of connecting members 14 which engage both the base frame 11 and a guide and adjustment channel 15 formed in the base 12.

Base 12 may comprise two horizontal, and preferably parallel, rails or elongated base profiles, extending in axial direction 55. Each of the two longitudinal base profiles may form its own guide and adjustment channel 15, advantageously a channel 15 formed in an upper surface of the elongated base profile and having an upside-down "T"-shaped cross section.

To the support structure 2 may be associated a flywheel 4 operatively connected to, and rotationally operable by means of, a flywheel motor 16 for simulating the inertia of the vehicle. The flywheel may be connected to a bearing body 96 which in turn is connected to the suspension assembly 3, or directly to the suspension assembly 3.

Description of the Wheel Load Assembly 5

According to one embodiment, the wheel load assembly 5 comprises:
- a support structure 17 assembled, or which can be assembled, on a base, for example on base 12,
- a vertical load device 18 having a first application bracket 19 which is connectable (rigidly to a bearing body 96 belonging to the wheel load assembly 5 and in turn connectable) to the wheel suspension part 3, a first reaction support 20 connected to the support structure 17, a first force transmission connector 21 connected between the first reaction support 20 and the first application bracket 19, as well as a first load apparatus 22 operatively connected to the first force transmission connector 21 to load (in traction and/or compression) the first force transmission connector 21 in a first vertical load direction 23,
- a longitudinal load device 24 having a second application bracket 25 which is connectable (rigidly to the bearing body 96, in turn connectable) to the wheel suspension part 3, a second reaction support 26 connected to the support structure 17, a second force transmission connector 27 connected between the second reaction support 26 and the second application bracket 25, as well as a second load apparatus 28 operatively connected to the second force transmission connector 27 to load (in traction and/or compression) the second force transmission connector 27 in a second (preferably horizontal) longitudinal load direction 29 transverse (preferably orthogonal) to the first vertical load direction 23 and to a wheel rotation axis 40 of the (wheel hub 43 of the) wheel suspension part 3,
- a lateral load device 30 having a third application bracket 31 which is connectable (rigidly to the bearing body 96, which in turn is connectable) to the wheel suspension part 3, a third reaction support 32 connected to the support structure 17, a third force transmission connector 33 connected between the third reaction support 32 and the third application bracket 31, as well as a third load apparatus 34 to load (in traction and/or compression) the third force transmission connector 33 in a third (horizontal) lateral load direction 35 parallel to the rotation axis 40 and therefore, transverse (preferably orthogonal), to the first vertical load direction 23 and to the second longitudinal load direction 29.

Figure 5:
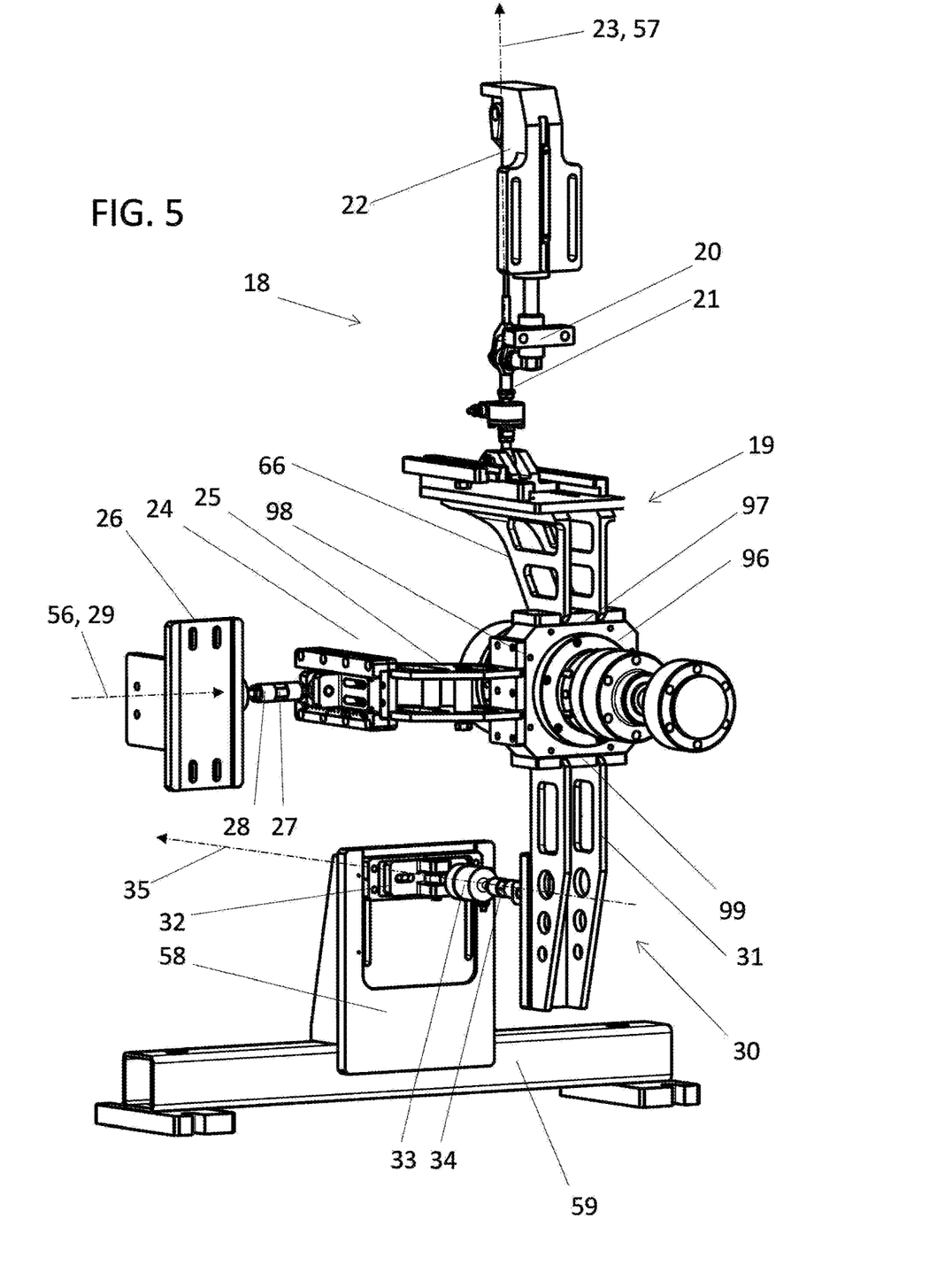
FIG. 5 is a perspective view of the individual load devices of the wheel load assembly, according to an embodiment.
Figure 6:
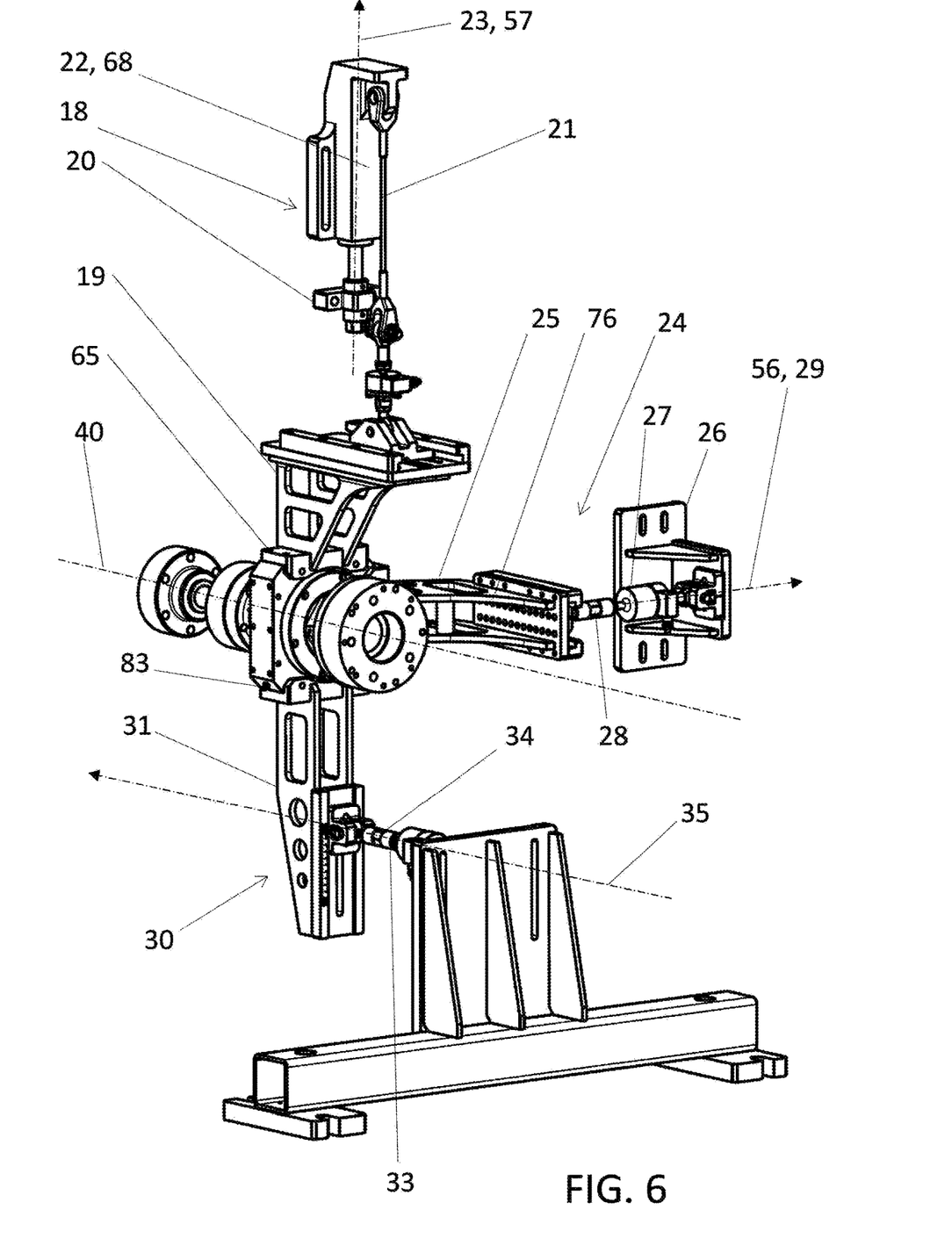
FIG. 6 is a further perspective view of the individual load devices of the wheel load assembly in FIG. 5.

According to an aspect of the invention:
- the first application bracket 19 comprises a first adjusting device 36 for adjusting the connection position of the first application bracket 19 with the first transmission connector 21 along a first (horizontal) axial adjustment direction 37 parallel to the wheel rotation axis 40, with the first application bracket 19 in the position of use,
- the second application bracket 25 comprises a second adjusting device 38 for adjusting the connection position of the second application bracket 25 with the second transmission connector 27 along a second (horizontal) axial adjustment direction 39 parallel to the wheel rotation axis 40, with the second application bracket 25 in the position of use,
- the third application bracket 31 comprises a third adjusting device 41 for adjusting the connection position of the third application bracket 31 with the third transmission connector 33 along a third vertical adjustment direction 42, with the third application bracket 31 in the position of use.

This configuration of the wheel load assembly 5 allows dynamic longitudinal loads to be applied on the wheel suspension part 3, in combination with the simulation of the inertia of the vehicle by means of the flywheel and/or in combination with pertaining synchronized or independent lateral loads to simulate lateral forces acting on the vehicle.

Figure 8:
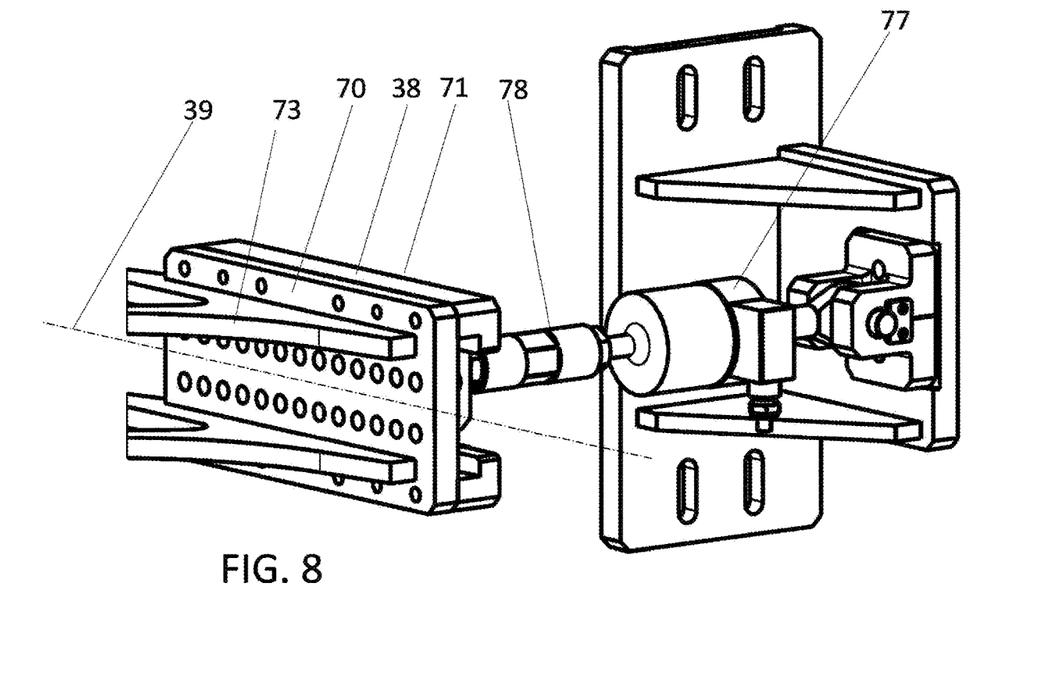
FIG. 8 is a perspective view of details of a longitudinal load device of the wheel load assembly according to an embodiment.

By virtue of the second adjustment device 38, longitudinal forces may be precisely applied in the middle of the wheel hub 43 in combination with the application of a braking torque in order to simulate the stresses of the vehicle during braking events as realistically as possible.

Moreover, the first 36, second 38, third 41 adjustment devices allow the independent adjustment of the force application points 6, 7, 8 to simulate for example, the axial offset position of the rim of the wheel (rim offset position or rim ET position) and/or the variation of the radial dimension of the wheel as realistically as possible by simulating different wheel sizes and/or different radial compression intensities of the wheel, and therefore, the (variation of the) position of the application of the lateral force during braking in a curve.

Detailed Description of the Support Structure 17

Figure 4:
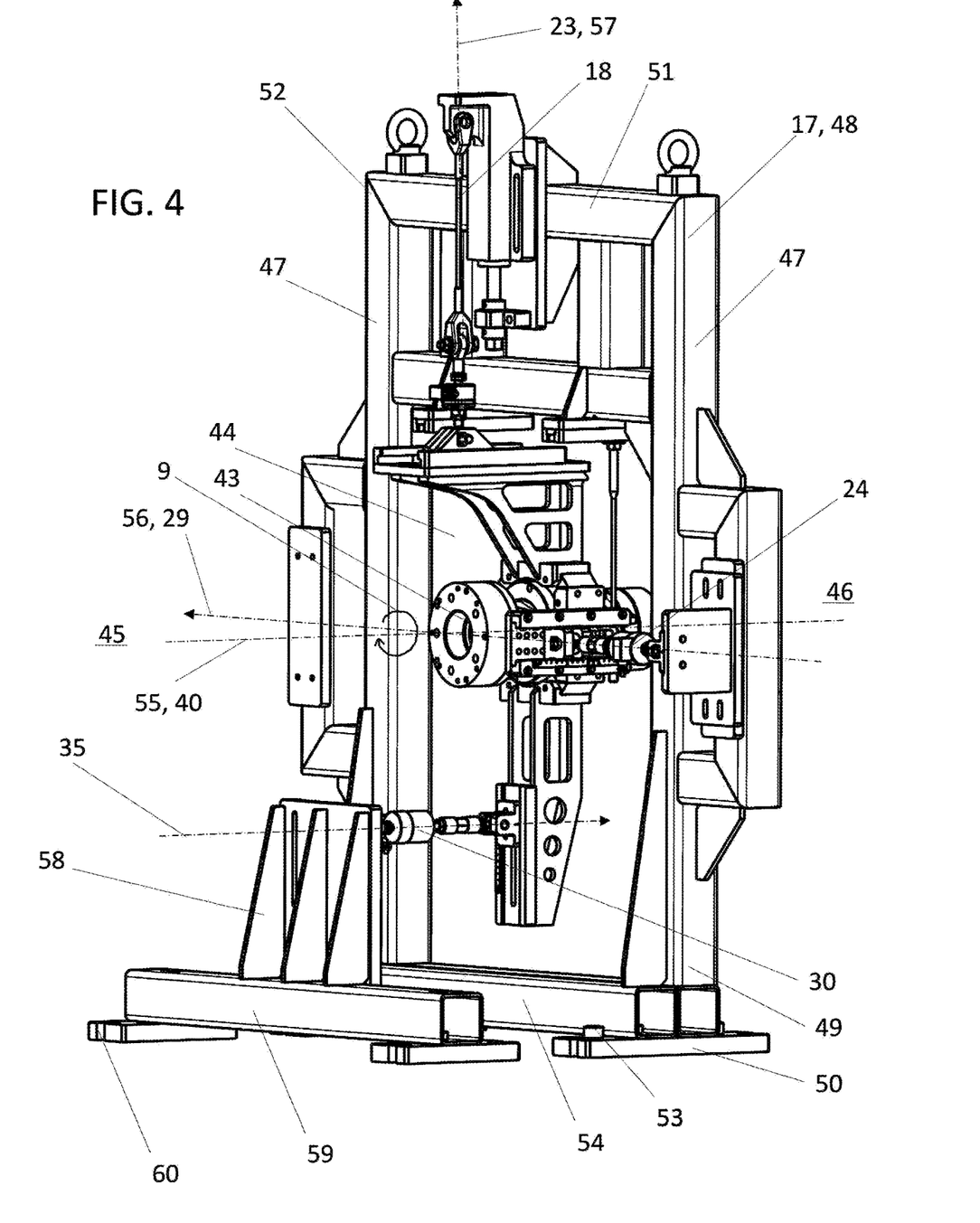
FIG. 4 is a perspective view of a wheel load assembly in FIG. 3, in which the part of wheel support has been removed.

According to an embodiment, the support structure 17 comprises a main frame 48 in the shape of bridge or frame, at least partially extending about a middle opening 44 passing in axial direction 55, and therefore open and freely accessible both from an inner side 45 of the wheel assembly 5 facing, during use, the support structure 2 and corresponding to an inner side of the vehicle, and from an outer side 46 of the wheel load assembly 5 facing, in use, away from the support structure 2 and corresponding to an outer side of the vehicle.

The main frame 48 may comprise two, preferably vertical, uprights 47, an upper, preferably horizontal, cross beam 51 which connects upper ends 52 of the two uprights 47, and one or more connection portions 50 formed at lower ends 49 of the uprights 47 for connecting the main frame 48 to base 12.

The connection of the main frame 48 on base 12 preferably is adjustable, for example by means of the releasable and lockable engagement of a plurality of connecting members 53 which engage both the connection portions 50 and the guide and adjustment channels 15 formed in the base 12.

The position adjustment of the main frame 48 on the base 12 takes place in the axial direction 55. The adjustment of the position of the support structure 17 with respect to the base 12, and therefore with respect to the support structure 2, together with the adjustment of the first adjustment device 36 and of the second adjustment device 38, all in axial direction 55, allow the application of the vertical force 8 and of the longitudinal force 6 at axial distances from the wheel hub 43 precisely corresponding to the axial offset position of the rim of the wheel (rim offset position or rim ET), and therefore a true simulation of the real load conditions.

The main frame 48 may further comprise a lower, preferably horizontal, cross beam 54 which connects the lower ends 49 of the uprights 47, thus completing the aforesaid frame-shaped configuration and giving the main frame 48 increased rigidity. The entire main frame 48 preferably defines a frame plane which is vertical and orthogonal to the axial direction 55.

The vertical load device 18, in particular the first reaction support 20, is connected to the upper cross beam 51. The longitudinal load device 24, in particular the second reaction support 26, is connected to one of the uprights 47. The selection of upright 47 on which to mount the longitudinal load device 24 depends on the volume of the components of the wheel suspension part 3, thus increasing the flexibility in use.

The support structure 17 may further comprise an auxiliary frame 58 spaced apart from the main frame 48 in axial direction 55, preferably on an inner side 45 of the support structure 17, i.e., between the main frame 48 and the support structure 2 of the test bench 1, and which supports the lateral load device 30, in particular the third reaction support 32.

The auxiliary frame 58 has a height which is less than half the height of the main frame 48, as well as a weight which preferably is less than half the weight of the main frame 48.

The auxiliary frame 58 may comprise a connection beam 59 for the connection of the auxiliary frame 58 to base 12, as well as a central upright 92 which extends from the connection beam 59 upwards, and which supports or forms the third reaction support 32.

The connection of the auxiliary frame 58 on base 12 is removable and preferably adjustable, preferably in axial direction 55, for example by means of the releasable and lockable engagement of a plurality of connecting members 60 which engage both the connection beam 59 and the guide and adjustment channels 15 formed in base 12. The axial sliding of the auxiliary frame 58 further allows the application points of the load to be adjusted according to the set rim axial offset value (ET).

The division of the support structure 17 into a main frame 48 in the shape of frame and a much smaller and lighter auxiliary frame 58 allows access to the space between the support structure 2 and the main frame 48 to be freed quickly and easily, i.e., the space where the wheel suspension part 3 is, by unmounting and removing the auxiliary frame 58 alone.

The support structure 17 thus configured is lighter than a construction as a single frame and such as to facilitate access to the components of brake 10 to allow a quick replacement of the components of brake 10 without modifying the entire set dynamometer test configuration.

Detailed Description of the Vertical Load Device 18

Figure 7:
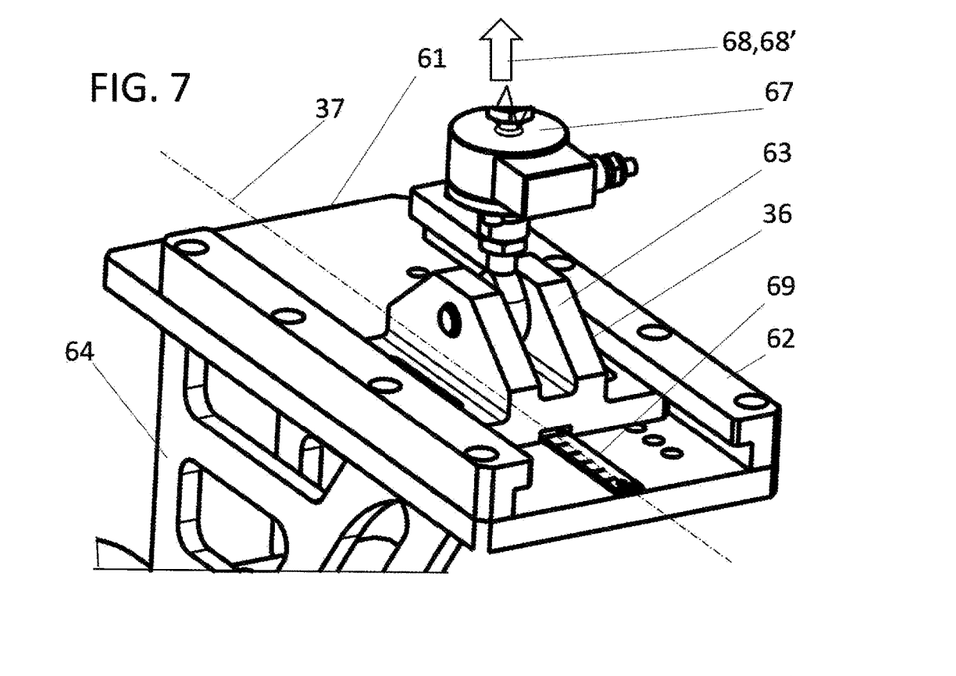
FIG. 7 is a perspective view of a detail of a vertical load device of the wheel load assembly according to an embodiment.

According to one embodiment, the first application bracket 19 has an angular shape with:
- a first adjusting plate 61 which forms a first guide profile 62 extending in axial direction 55 during use, to which a first slide 63 is coupled which is slidingly positionable and lockable (for example by means of lock screws) along the first guide profile 62,
- a first application arm 64 protruding at an angle from the first adjusting plate 61 and the free end of which forms a first fastening seat 65 (for example a perforated profile, possibly having "L"- or "U"-shaped section) which is connectable to the bearing body 96.

Advantageously, the first adjusting plate 61 comprises a first graduated scale 69 and the first slide 63 comprises a marking or a reference edge adjacent to the first graduated scale 69 to facilitate a precise adjustment of position, for example a continuous adjustment of the axial offset of the vertical force 8, for example in the range between +60 mm and −100 mm.

The first adjusting plate 61 and the first application arm 64 together form a concave groove 66 facing in axial direction 55 towards the inner side 45 of the wheel load assembly 5 to avoid violations of space between the wheel load assembly 5 and the wheel suspension part 3 undergoing the test.

The first force transmission connector 21 may comprise a tie rod provided with a first load cell 67 and connected to the first slide 63, preferably in an articulated manner.

Figure 13:
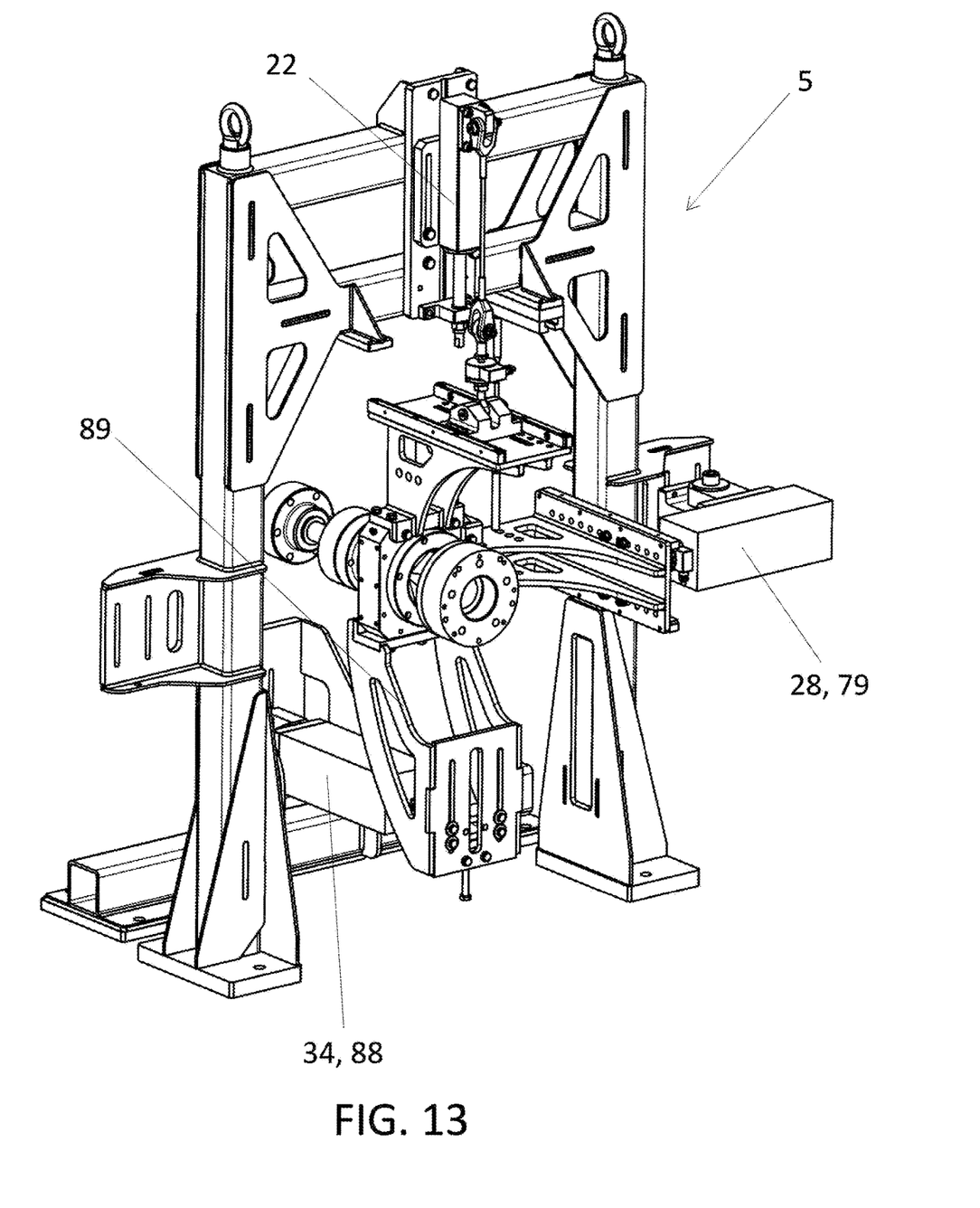
FIG. 13 is a perspective view of the wheel load assembly with actuators for an application of dynamic forces, according to an embodiment.

The first load apparatus 22 may comprise a first actuator 68, for example a fluid-dynamic, in particular hydraulic, cylinder-piston unit or an electric actuator, connected between the first reaction support 20 and the first transmission connector 21.

Alternatively, the first load apparatus 22 may comprise a screw and nut screw tensioner 68' integrated in the first force transmission connector 21, or a damper 68" for generating a preload, possibly cushioned, force in vertical direction.

The first load apparatus 22 may be configured to generate a vertical load, for example almost static or dynamic.

The constant static vertical load 8 during the dynamometer test may be for example, in the range between 500 Newtons and 7000 Newtons. A dynamic variation of the vertical force 8 during a braking simulation and consistent with the actuation of brake 10 (e.g., 1000 bar/s) may be in the range between +1000 Newtons and −1000 Newtons.

Detailed Description of the Longitudinal Load Device 24

Figure 9:
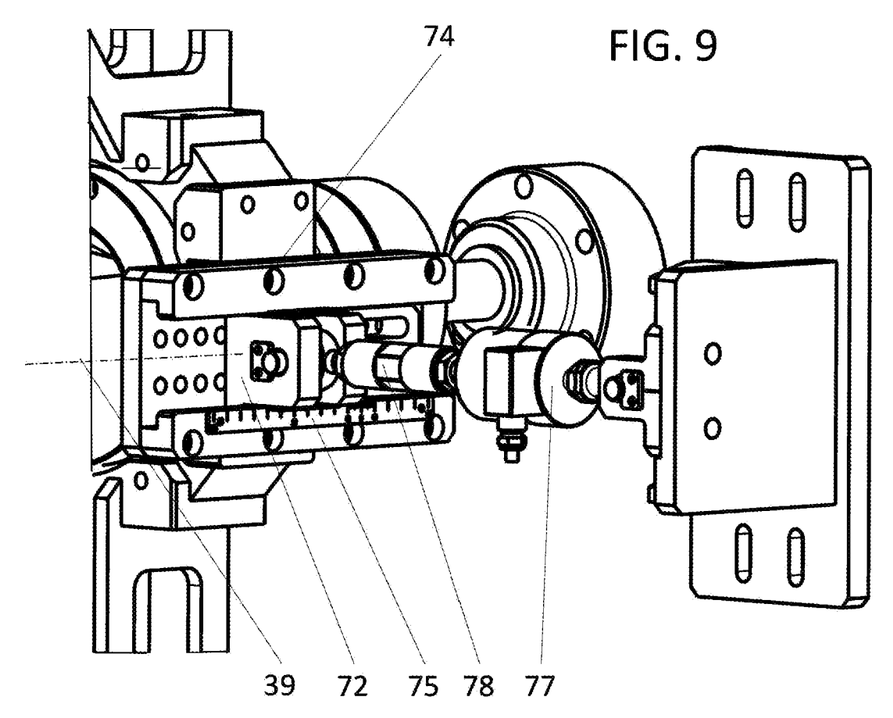
FIG. 9 is another perspective view of details of a longitudinal load device of the wheel load assembly according to an embodiment

According to one embodiment, the second application bracket 25 has an angular shape with:
- a second adjusting plate 70 which forms a second guide profile 71 extending in axial direction 55 during use, to which a second slide 72 is coupled which is slidingly positionable and lockable (for example by means of lock screws) along the second guide profile 71,
- a second application arm 73 protruding at an angle from the second adjusting plate 70 and the free end of which forms a second fastening seat 74 (for example a perforated profile, possibly having "L"- or "U"-shaped section) which is connectable to the bearing body 96.

Advantageously, the second adjusting plate 70 comprises a second graduated scale 75 and the second slide 72 comprises a marking or a reference edge adjacent to the second graduated scale 75 to facilitate a precise adjustment of position, for example a continuous adjustment of the axial offset of the longitudinal load 6, for example in the range between +60 mm and −100 mm.

The second adjusting plate 70 and the second application arm 73 together form a concave groove 76 facing in axial direction 55 towards the inner side 45 of the wheel load assembly 5 to avoid violations of space between the wheel load assembly 5 and the wheel suspension part 3 undergoing the dynamometer test.

The second force transmission connector 27 may comprise a push-pull bar, having one or more segments, provided with a second load cell 77 and connected to the second slide 72, preferably in an articulated manner.

The second load apparatus 28 may comprise a screw and nut screw tensioner 78 integrated in the second force transmission connector 27.

Alternatively, the second load apparatus 28 may comprise a second actuator 79, for example a fluid-dynamic, in particular hydraulic, cylinder-piston unit or an electric actuator, connected between the second reaction support 26 and the second force transmission connector 27.

The second load apparatus 28 may be configured to generate an almost static longitudinal stress or a dynamic longitudinal stress. The constant static longitudinal load 6 during the dynamometer test may be for example, zero or in the range between −6000 Newtons and +6000 Newtons. A dynamic variation of the longitudinal force 6 during a braking simulation and consistent with the actuation of brake 10 (e.g., 1000 bar/s) may be in the range between +6000 Newtons and −6000 Newtons, preferably in the range between +4000 Newtons and −4000 Newtons, with absolute maximum values up to 6000 Newtons or also higher.

A maximum stroke of the second actuator 79 in longitudinal direction 56 advantageously is limited to maximum 5 mm or 10 mm in order to obviate the risk of misalignment between the wheel rotation axis 40 (wheel shaft) and the test bench 1.

According to a further embodiment, the position of the second reaction support 26 with respect to the support structure 17 is adjustable in height.

Detailed Description of the Lateral Load Device 30

Figure 10:
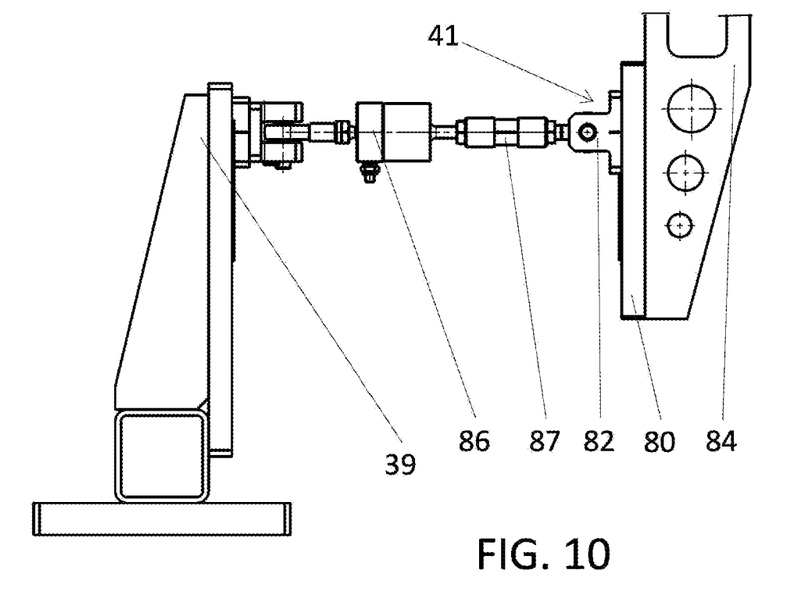
FIG. 10 is a perspective view of details of a lateral load device of the wheel load assembly according to an embodiment.
Figure 11:
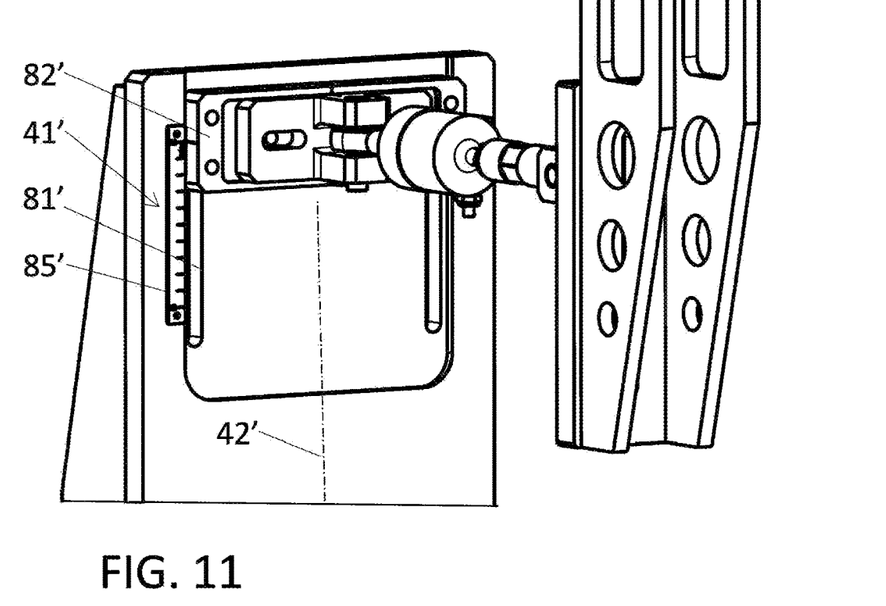
FIG. 11 is another perspective view of details of a lateral load device of the wheel load assembly according to an embodiment.
Figure 12:
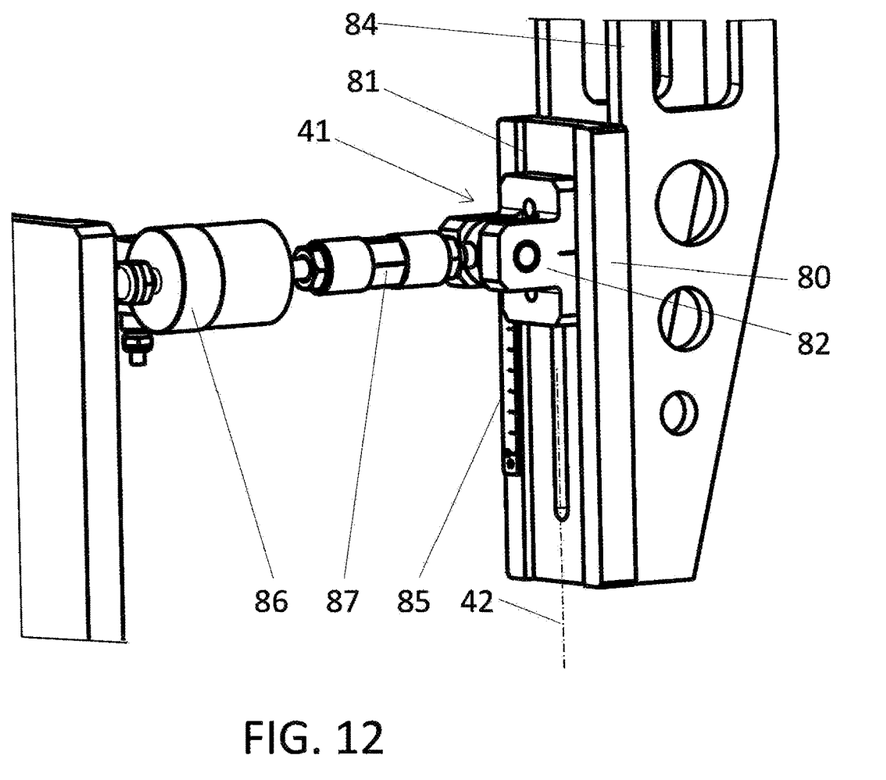
FIG. 12 is another perspective view of details of a lateral load device of the wheel load assembly according to an embodiment.

According to one embodiment, the third application bracket 31 has an elongated shape with:
- a third adjusting plate 80 which forms a third guide profile 81 extending in vertical direction 57 during use, to which a third slide 82 is coupled which is slidingly positionable and lockable (for example by means of lock screws) along the third guide profile 81,
- a third application arm 84 connected and extending parallel to the third adjusting plate 80, and the free end of which forms a third fastening seat 83 (for example a perforated profile, possibly having "L"- or "U"-shaped section) which is connectable to the bearing body 96.

Advantageously, the third adjusting plate 80 comprises a third graduated scale 85 and the third slide 82 comprises a marking or a reference edge adjacent to the third graduated scale 85 to facilitate a precise adjustment of position, for example a continuous adjustment of the vertical downwards offset (which simulates the wheel diameter) of application of the lateral load 7.

The third transmission connector 33 may comprise a push-pull bar, having one or more segments, provided with a third load cell 86 and connected to the third slide 82, preferably in an articulated manner.

The third load apparatus 34 may comprise a screw and nut screw tensioner 87 integrated in the third force transmission connector 33.

Alternatively, the third load apparatus 34 may comprise a third actuator 88, for example a fluid-dynamic, in particular hydraulic, cylinder-piston unit or an electric actuator, connected between the third reaction support 32 and the third force transmission connector 33.

The third load apparatus 34 may be configured to generate an almost static lateral stress or a dynamic lateral stress. The constant static lateral load 7 during the dynamometer test may be for example, zero or in the range between +6000 Newtons and −6000 Newtons, preferably between −4000 Newtons and +4000 Newtons. A dynamic variation of the lateral force 7 during a braking in a curve simulation may be in the range between +6000 Newtons and −6000 Newtons, preferably between +4000 Newtons and −4000 Newtons, with absolute maximum values up to 6000 Newtons or also higher. An actuation frequency of the third actuator 88 may be for example, maximum 5 Hz.

A maximum stroke of the third actuator 88 in longitudinal direction 56 advantageously is limited to maximum 5 mm in order to obviate the risk of misalignment between the wheel rotation axis 40 of the wheel suspension part 3 (wheel shaft) and the test bench 1.

According to a further embodiment, the position of the third reaction support 32 with respect to the support structure 17 is adjustable in longitudinal direction 56 and preferably in height.

The lateral load device 30 may comprise a fourth device 41' for adjusting the connection position of the third transmission connector 33 to the third reaction support 32 or more generically, to the support structure 17, in a fourth adjustment direction 42' which is parallel to the aforesaid third vertical adjustment direction 42.

For this purpose, the third reaction support 32 with the support structure 17 forms a fourth guide profile 81' extending in vertical direction 57, to which a fourth slide 82' is coupled which is slidingly positionable and lockable along the fourth guide profile 81'. The third reaction support 32 or the fourth guide profile 81' comprises a fourth graduated scale 85' and the fourth slide 82' comprises a marking or a reference edge adjacent to the fourth graduated scale 85' to facilitate a precise adjustment of position, in particular the continuous adjustment of the vertical downwards offset (which simulates the wheel diameter) of application of the lateral load 7, and at the same time maintain the lateral force 7 parallel to the wheel rotation axis 40.

According to one embodiment, for example in the presence of the third actuator 88 which may cause a given volume between the auxiliary frame 58 and the main frame 48, the auxiliary frame 58 may be arranged on the outer side 46 of the support structure 17. In this case, to avoid violations of space between the wheel load assembly 5 and the wheel suspension part 3 undergoing the test, also the third application bracket 31 may form a concave groove 89 facing in the axial direction 55 towards the inner side 45 of the load assembly 5.

By virtue of the configuration of the vertical, longitudinal, and lateral load devices, the wheel load assembly 5 allows a versatile, modular reconfiguration thereof and the repositioning, removal, and replacement of individual components in an easy and modular manner.

Description of the Bearing Body 96

According to one embodiment, the first application bracket 19, the second application bracket 25 and the third application bracket 31, or more correctly, the first fastening seat 65, the second fastening seat 74 and the third fastening seat 83, are assembled, or can be assembled, for example by means of screws, to corresponding first 97, second 98 and third 99 connection sides of a bearing body 96 belonging to the load assembly 5 but which is connectable to the wheel suspension part 3 so as to allow the rotation of the wheel hub 43 and/or of a disc brake of brake 10 about the wheel rotation axis 40 with respect to the first application bracket 19, the second application bracket 25 and the third application bracket 31 to thus allow the transmission of the rotation speed and of the torque from the engine to the brake disc.

The bearing body 96 and the first application bracket 19, the second application bracket 25 and the third application bracket 31 may be preassembled to form a bearing unit which is connectable to the wheel suspension part 3.

Description of the Electronic Control System 90

Figure 2:
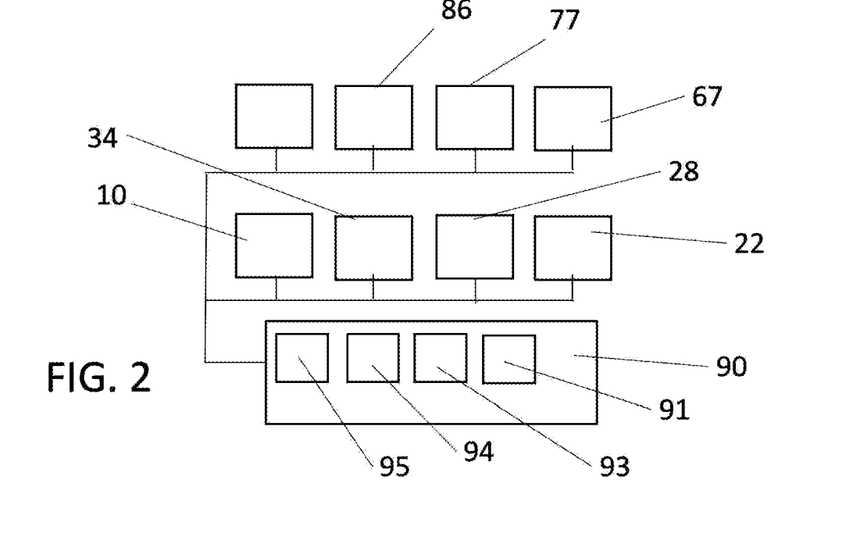
FIG. 2 diagrammatically shows the interaction of a control system of the dynamometer test bench with some of the operating units thereof.

According to one embodiment, the dynamometer test bench 1 or the wheel load assembly 5 comprises an electronic control system 90 connected to one or more or all of the first 68, second 79, third 88 actuators, and possibly with brake 10 of the wheel suspension part 3, as well as possibly with one, several or all of the first, second and third load cells, and configured for an independent and selective, or coordinated and synchronized, control of the one or more or all of the first 68, second 79, third 88 actuators, and possibly of brake 10, depending on a dynamometer test program which can be uploaded or programmed by a user or stored in a memory 91 of the electronic control system 90.

The electronic control system 90 may comprise for example, a computer with a processor 93, memory 91, a user interface 94 (monitor, keyboard) and possibly, wireless and cabled signal communication interfaces 95. The first 68, second 79, third 88 actuators and the electronic control system 90 allow dynamic longitudinal 6 and/or lateral 7 and/or vertical 8 forces to be applied to the wheel suspension part 3 according to force-time curves which can be set and synchronized with the dynamometric action of brake 10.

Obviously, those skilled in the art, in order to meet contingent and specific needs, may make further changes and variations to the dynamometer test bench 1 and to the wheel load assembly 5 according to the present invention, all without departing from the scope of protection of the invention, as defined by the following claims.

What is claimed is:

1. A wheel load assembly for a dynamometer test bench of the type having a support structure for fastening a wheel suspension part to be subjected to a dynamic test, and a wheel load assembly for applying forces to the wheel suspension part, said wheel load assembly comprising:
    a support structure which can be assembled on a base,
    a vertical load device having a first application bracket connectable, in particular by means of a bearing body, to the wheel suspension part, a first reaction support connected to the support structure, a first force transmission connector connected between the first reaction support and the first application bracket, as well as a first load apparatus operatively connected with the first force transmission connector to load the first force transmission connector into a first vertical load direction,
    a longitudinal load device having a second application bracket connectable, in particular by means of the bearing body, to the wheel suspension part, a second reaction support connected to the support structure, a second force transmission connector connected between the second reaction support and the second application bracket, as well as a second load apparatus operatively connected with the second force transmission connector to load the second force transmission connector into a second longitudinal load direction transverse to the first vertical load direction and to a wheel rotation axis of the wheel suspension part,
    a lateral load device having a third application bracket connectable, in particular by means of the bearing body, to the wheel suspension part, a third reaction support connected to the support structure, a third force transmission connector connected between the third reaction support and the third application bracket, as well as a third load apparatus to load the third force transmission connector into a third lateral load direction parallel to the wheel rotation axis and transverse to the first vertical load direction and to the second longitudinal load direction,
    characterized in that:
    the first application bracket comprises a first adjusting device for adjusting the connection position of the first application bracket with the first transmission connector, along a first axial adjustment direction parallel to the wheel rotation axis, with the first application bracket in the position of use,
    the second application bracket comprises a second adjustment device for adjusting the connection position of the second application bracket with the second transmission connector, along a second axial adjustment direction parallel to the wheel rotation axis, with the second application bracket in the position of use,
    the third application bracket comprises a third adjustment device for adjusting the connection position of the third application bracket with the third transmission connector, along a third vertical adjustment direction, with the third application bracket in the position of use.

2. A wheel load assembly according to claim 1, wherein the support structure comprises:
    a main frame comprising two uprights, an upper cross beam which connects upper ends of the two uprights, and one or more connection portions formed at lower ends of the uprights for an adjustable connection in axial direction of the main frame to a base of the test bench,
    an auxiliary frame spaced apart from the main frame in axial direction and comprising a connection beam for a connection of the auxiliary frame on the base, said connection being removable and adjustable in axial direction, as well as a central upright which extends from the connection beam upwards,
    wherein the auxiliary frame has a height which is less than half the height of the main frame, as well as a weight which is less than half the weight of the main frame,
    wherein the vertical load device is connected to the upper cross beam and the longitudinal load device is connected to one of the uprights of the main frame, while the lateral load device is connected to the central upright of the auxiliary frame.

3. A wheel load assembly according to claim 1, wherein:
    the first application bracket comprises:
        a first adjusting plate which forms a first guide profile extending in axial direction during use, to which a first slide is coupled which can be slidingly positioned and locked along the first guide profile,
        a first application arm protruding from the first adjusting plate and which free end forms a first fastening seat which can be connected to a bearing body coupled to the wheel suspension part.

4. A wheel load assembly according to claim 3, wherein the first adjusting plate comprises a first graduated scale and the first slide comprises a marking or a reference edge adjacent to the first graduated scale.

5. A wheel load assembly according to claim 3, wherein the first application arm forms a concave groove facing in axial direction towards the inner side of the wheel load assembly.

6. A wheel load assembly according to claim 3, wherein the first force transmission connector comprises a tie rod provided with a first load cell and connected to the first slide.

7. A wheel load assembly according to claim 1, wherein the first load apparatus comprises one or more of:
    a first actuator,
    a screw and nut screw tensioner,
    a damper,
    connected between the first reaction support and the first transmission connector to generate a static or dynamic vertical load.

8. A wheel load assembly according to claim 1, wherein the second application bracket comprises:
    a second adjusting plate which forms a second guide profile extending in axial direction during use, to which a second slide is coupled which can be slidingly positioned and locked along the second guide profile,
    a second application arm protruding from the second adjusting plate and which free end forms a second fastening seat which can be connected to a bearing body coupled to the wheel suspension part.

9. A wheel load assembly according to claim 8, wherein the second adjusting plate comprises a second graduated scale and the second slide comprises a marking or a reference edge adjacent to the second graduated scale.

10. A wheel load assembly according to claim 8, wherein the second application arm forms a concave groove facing in axial direction towards the inner side of the wheel load assembly.

11. A wheel load assembly according to claim 1, wherein the second force transmission connector comprises a push-pull bar provided with a second load cell and connected to the second slide in articulated manner.

12. A wheel load assembly according to claim 1, wherein the second load apparatus comprises one or more of:
   a screw and nut-screw tensioner integrated in the second force transmission connector,
   a second actuator,
for generating a static or dynamic longitudinal load.

13. A wheel load assembly according to claim 1, wherein the position of the second reaction support with respect to the support structure is adjustable in height.

14. A wheel load assembly according to claim 1, wherein the third application bracket comprises:
   a third adjusting plate which forms a third guide profile extending in vertical direction during use, to which a third slide is coupled which can be slidingly positioned and locked along the third guide profile,
   a third application arm protruding from the third adjusting plate and which free end forms a third fastening seat which can be connected to a bearing body coupled to the wheel suspension part.

15. A wheel load assembly according to claim 14, wherein the third adjusting plate comprises a third graduated scale and the third slide comprises a marking or a reference edge adjacent to the third graduated scale.

16. A wheel load assembly according to claim 1, wherein the third transmission connector comprises a push-pull bar provided with a third load cell and connected to the third slide in articulated manner.

17. A wheel load assembly according to claim 1, wherein the third load apparatus comprises one or more of:
   a screw and nut-screw tensioner integrated in the third force transmission connector,
   a third actuator,
for generating a static or dynamic lateral load.

18. A wheel load assembly according to claim 1, wherein the third reaction support forms a fourth adjustment device for an adjustment in vertical direction of the connection point of the third force transmission connector with respect to the support structure.

19. A wheel load assembly according to claim 1, wherein the position of the third reaction support with respect to the support structure is adjustable in longitudinal direction.

20. A wheel load assembly according to claim 1, comprising an electronic control system connected with one or more of the first, second and third load apparatuses, and possibly with a brake of the wheel suspension part, and configured for a control thereof dependent on a dynamometric test program which can be loaded or is stored in a memory of the electronic control system.

21. A dynamometer test bench, comprising a wheel load assembly for a dynamometer test bench of the type having a support structure for fastening a wheel suspension part to be subjected to a dynamic test, and a wheel load assembly for applying forces to the wheel suspension part, said wheel load assembly comprising:
   a support structure which can be assembled on a base,
   a vertical load device having a first application bracket connectable, in particular by means of a bearing body, to the wheel suspension part, a first reaction support connected to the support structure, a first force transmission connector connected between the first reaction support and the first application bracket, as well as a first load apparatus operatively connected with the first force transmission connector to load the first force transmission connector into a first vertical load direction,
   a longitudinal load device having a second application bracket connectable, in particular by means of the bearing body, to the wheel suspension part, a second reaction support connected to the support structure, a second force transmission connector connected between the second reaction support and the second application bracket, as well as a second load apparatus operatively connected with the second force transmission connector to load the second force transmission connector into a second longitudinal load direction transverse to the first vertical load direction and to a wheel rotation axis of the wheel suspension part,
   a lateral load device having a third application bracket connectable, in particular by means of the bearing body, to the wheel suspension part, a third reaction support connected to the support structure, a third force transmission connector connected between the third reaction support and the third application bracket, as well as a third load apparatus to load the third force transmission connector into a third lateral load direction parallel to the wheel rotation axis and transverse to the first vertical load direction and to the second longitudinal load direction,
characterized in that:
   the first application bracket comprises a first adjusting device for adjusting the connection position of the first application bracket with the first transmission connector, along a first axial adjustment direction parallel to the wheel rotation axis, with the first application bracket in the position of use,
   the second application bracket comprises a second adjustment device for adjusting the connection position of the second application bracket with the second transmission connector, along a second axial adjustment direction parallel to the wheel rotation axis, with the second application bracket in the position of use,
   the third application bracket comprises a third adjustment device for adjusting the connection position of the third application bracket with the third transmission connector, along a third vertical adjustment direction, with the third application bracket in the position of use.

\* \* \* \* \*